(12) United States Patent
Chen

(10) Patent No.: US 8,899,656 B1
(45) Date of Patent: Dec. 2, 2014

(54) INDEPENDENT AND ANONYMOUS NIGHT TIME GLARE REDUCTION SYSTEM

(71) Applicant: Sam Mingsan Chen, Rockville, MD (US)

(72) Inventor: Sam Mingsan Chen, Rockville, MD (US)

( * ) Notice: Subject to any disclaimer, the term of this patent is extended or adjusted under 35 U.S.C. 154(b) by 0 days.

(21) Appl. No.: 14/083,574

(22) Filed: Nov. 19, 2013

Related U.S. Application Data

(60) Provisional application No. 61/898,618, filed on Nov. 1, 2013.

(51) Int. Cl.
*B60J 3/00* (2006.01)

(52) U.S. Cl.
USPC .......................... 296/97.7; 296/97.1; 296/97.2

(58) Field of Classification Search
USPC ............... 296/97.1, 97.2, 97.7, 97.8; 362/259
See application file for complete search history.

(56) References Cited

U.S. PATENT DOCUMENTS

| | | | |
|---|---|---|---|
| 4,818,011 A | 4/1989 | Cherian | |
| 5,247,391 A * | 9/1993 | Gormley | 359/601 |
| 6,318,787 B1 | 11/2001 | Fahy | |
| 6,515,425 B1 | 2/2003 | Bender | |
| 6,568,738 B1 | 5/2003 | Braun | |
| 6,575,569 B1 | 6/2003 | Castellano | |
| 6,646,801 B1 | 11/2003 | Sley | |
| 7,322,632 B1 * | 1/2008 | Marszalek | 296/97.7 |
| 7,431,376 B1 * | 10/2008 | Marszalek | 296/97.7 |
| 7,537,365 B2 | 5/2009 | Bender | |
| 8,140,219 B2 | 3/2012 | Cernasov | |
| 8,143,563 B2 | 3/2012 | Broude et al. | |
| 2003/0103141 A1 * | 6/2003 | Bechtel et al. | 348/148 |
| 2011/0264333 A1 * | 10/2011 | Yuter | 701/49 |
| 2012/0126099 A1 | 5/2012 | Tewari et al. | |

* cited by examiner

*Primary Examiner* — Lori L Lyjak

(57) ABSTRACT

This invention uses fixed number of randomly generated pulses to turn on/off headlamp(s) and viewing screen simultaneously in each base time interval. The percentage of total "on" time during each base interval, the duty cycle, is low. This method dims the oncoming headlights by at least a half without dimming any objects illuminated by own vehicle's headlights. The system is independent and anonymous, meaning in order to make the system work, there is no need for other vehicles to install anything nor will drivers of other vehicles notice anything different in the vehicle with such system installed.

13 Claims, 2 Drawing Sheets

INDEPENDENT AND ANONYMOUS NIGHT TIME GLARE REDUCTION SYSTEM

FIELD OF INVENTION

The present invention is directed to improve automobile safety.

BACKGROUND OF THE INVENTION

The U.S. National Highway Traffic Safety Administration states that nearly half of all traffic-related fatalities occur in the dark, despite only 25% of traffic traveling during darkness. Besides poor visibility and driver fatigue, the glare from headlight of oncoming traffic also makes the night time driving hazardous. As people age, the progress of cataract will make the glare even worse. However, there is little a driver can do except moving viewing direction away from the glare. By looking away, the driver will not be able to see the left curb or lane divider.

To reduce the hazard caused by headlight glare, government sets regulations on the beam pattern and the intensity of headlights. Government may also require drivers to turn off high beam when approaching other vehicles. However, there are still cars on the road not fully conforming to government regulations. The increase use of HID headlamps makes the glare more serious. Even if all cars meet government regulations, there can be still difficulty to drivers with certain vision deficiency or when the road condition is unfavorable.

The automobile industry has perfected visors to mitigate Sun glare for daylight driving. However, the Sun visor system cannot be transformed directly into a night time visor to reduce glare from headlights of oncoming vehicles. The reason is simple: the Sun is above in the sky and there is nothing near the Sun you need to see while in the case of headlight glare, you do need to see many objects around the headlight beam including the vehicle whose headlight is shining on you. If you use an opaque visor to block the headlight, you block objects you need to see around it.

Inventors attempted to mitigate this problem with various designs. There were basically six types of glare reduction methods cited in the US patent database. The first type is to improve headlamps by control of its intensity or beam width to reduce glare to other vehicles (U.S. Pat. No. 7,537,365 Bender, Glare reducing enhancements for vehicle exterior lighting systems and U.S. Pat. No. 6,515,425 Bender, Headlight anti-glare system). Such systems need government regulations to require every vehicle to install such system. The second type is to control the transparency of a pair of glasses worn by the driver or transparency of window glass to partially reduce the light to driver's eyes (U.S. Pat. No. 8,140,219 Cernasov, Automatic glare reduction system for vehicles; U.S. Pat. No. 8,143,563B2 Broude, Enhanced glare reduction and U.S. Pat. No. 6,575,569 Castellano, Headlight glare reducing ophthalmic lens system). Such methods will dim objects in the neighborhood as well. The third method is to use a small movable visor or semitransparent visor playing similar role as a Sun visor during the day (U.S. Pat. No. 6,318,787 Fahy, Automobile glare visor and U.S. Pat. No. 4,818,011 Cherian, Anti-glare visor system). Such method may also block neighborhood. The fourth one uses a sensor to detect glare intensity then increase intensity of own light to make the viewing field "homogeneous" (U.S. Pat. No. 6,568,738 Braun, Optical glare limiter). It reduces the "blinding effect" but the driver still cannot see objects clearly. The fifth is to require vehicles to polarize headlights in a fixed direction and let drivers to wear glasses polarized in perpendicular direction (U.S. Pat. No. 6,646,801 Sley, Glare Reduction System and Method). This obviously reduces the headlight glare but the driver will have difficulty to see objects illuminated by his/her own headlights because they are polarized in the same direction as other vehicles. The sixth requires both vehicles to install LCF on headlamps and windscreen. By detecting the other vehicle's phase and let the windshield LCF to be darkened during the bright phase of the other vehicle's light to reduce glare (US patent Application 20120126099 Tewari, Method for Reducing Glare from Light Source Through Windscreens). The requirement of both vehicles to install such system is not very practical. The presence of a third vehicles will pose problem. The patent does have a portion to deal with other cases with a complex method to darken certain area on the windshield between driver eyes and glare source by detecting the location of light source and driver eye position. The whole system is very complex.

To compare and evaluate diverse methods, we need some universal criteria. For a glare reduction system to be effective and practical, it has to meet the following three basic requirements: 1. It must work independently, meaning there is no need for other vehicle to make any change such as to require all other vehicles to install certain headlamps. 2. It must be anonymous, meaning other vehicle will not notice any change in the vehicle with the device installed. 3. It must not be self defeating, meaning the installed device shall not impede the original function of current installed equipment, especially headlamps. In other words, the objects being illuminated by own headlights shall not be dimmed. So far we have not found any patent, approved or in process, satisfying all three requirements.

BRIEF SUMMARY OF THE INVENTION

This invention solves night time headlight glare problem using a system with strobe type lamp and a viewing screen which can be switched between dark and transparent quickly. It works by dividing time into repeated base intervals and simultaneously turning on headlamp and viewing screen only at a fixed number of randomly selected pulses in each base interval. It dims the oncoming headlights by at least a half without dimming any objects illuminated by own vehicle's headlights. The system is independent and anonymous, meaning in order to make the system to work there is no need for other vehicles to install anything. Nor will drivers of other vehicles notice anything different in your vehicle.

The system is simple to manufacture. It has no sensor so it will not be affected by environmental conditions.

DETAILED DESCRIPTION OF THE INVENTION

Figure 1:
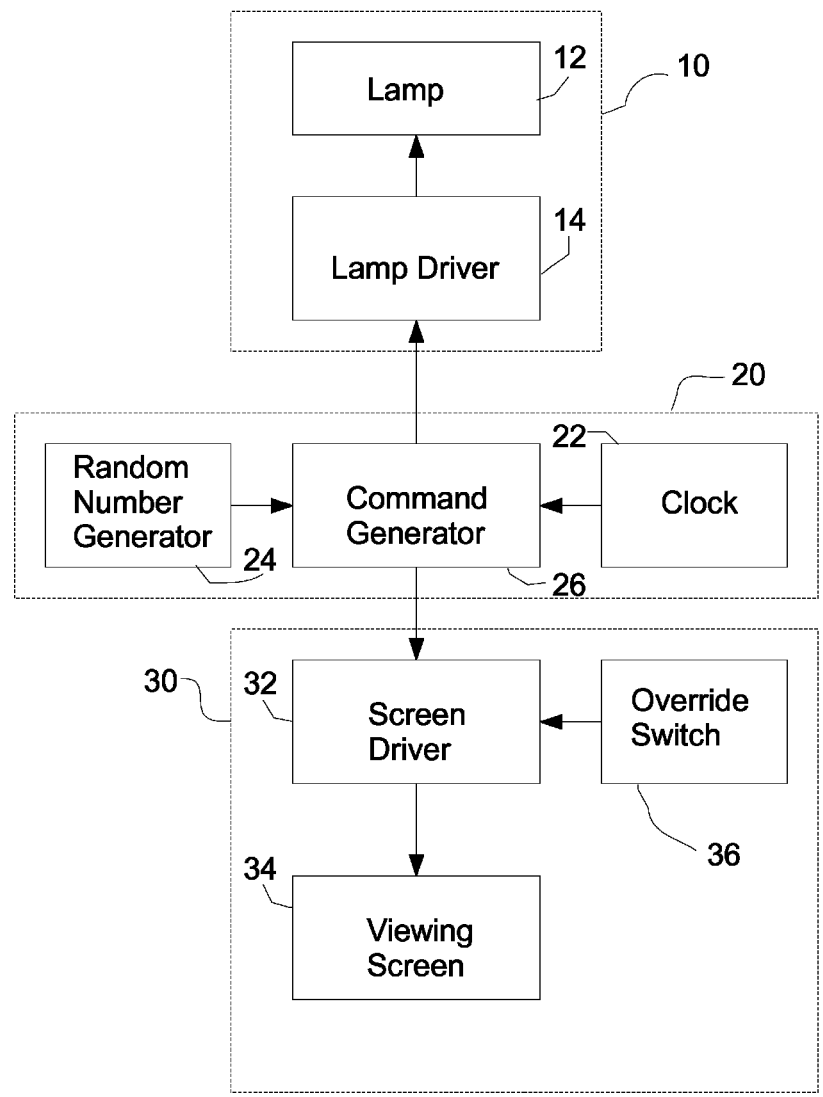
FIG. 1 is a diagram showing the components of the system and the signal flow between the components.
Figure 2:
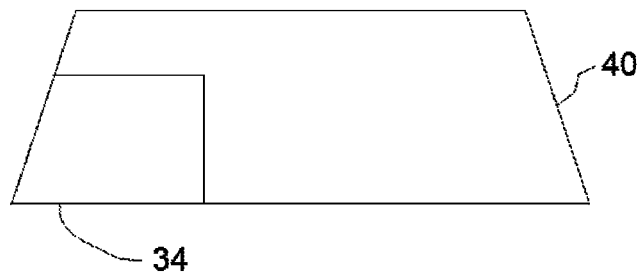
FIG. 2 is an illustration of one embodiment with the Viewing Screen attached to the left lower corner of windshield.
Figure 3:
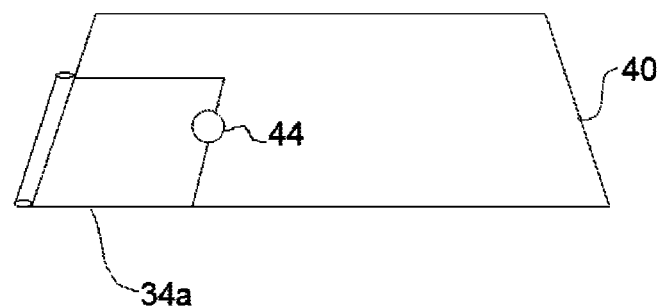
FIG. 3 shows another embodiment of viewing screen, which can be pulled out from within the frame and attached to windshield using suction cup.

To solve the night time glare problem we must think "out of box". We want to view the issue from a completely different angle and rephrase the problem into a telecommunication problem: 1. There are multiple vehicles sharing the same road. 2. Headlamp (plays role of a transmitter) shines light (signal) to objects and the reflected lights come back to the driver's eyes (receiver). This sets up a communication channel from transmitter to receiver. 3. Each driver tries to see only (actually, "mainly") his/her own vehicle's light while dimming others' (meaning suppress cross talk between channels). This way, the problem becomes a "Multiple Access" problem. We can then borrow concepts from telecommunication technology to solve this kind of multiple access problem.

It is well known to anyone familiar with telecommunication that multiple users can share same media using TDMA or CDMA technologies. Both are mature technology but no one has ever used such concepts in vehicle headlight control. That is exactly what we will present here in this invention. We will use the idea behind TDMA and CDMA but not TDMA or CDMA per se because after all they are from different fields and direct copying will not work. The obvious difference is that we do not have central station to co-ordinate the channels—every vehicle is on its own.

Let us re-interpret some methods other people have proposed in terms of this "multiple access" concept although the authors may or may not realize it at the time of their writing. It is obvious now that the polarized light idea (the fifth) is actually PDMA (polarization division multiple access). In fact, the communication between a satellite and ground station sometimes uses this method to separate uplink and downlink channels. One type of 3D TV also uses this method. However, this can only deal with two channels while we have many vehicles on the road.

Detecting phase (meaning time) of oncoming light to adjust own filter phase (the sixth) is a kind of TDMA. That is, the two vehicles use alternating time slots for their headlamp/filter while the co-ordination is based on detection. In fact, "fixed" time division is already used in another type of 3D TV to separate frames for left eye and frames for right eye (two channels only). However, when there is a third, a fourth vehicle involved, the system will not be able to handle. It also cannot handle the case when the oncoming car is using ordinary headlamps. To deal with mixed types of oncoming headlights from multiple vehicles, this method will not work. This is why the inventors tried to add another system, which detects the direction of oncoming light as well as driver head location to determine which part of windshield shall be darkened. However, there might be several vehicles coming so the detector(s) (maybe an Imager instead) need to track all of them making the system too complex.

Our Glare Reduction System is composed of a headlamp system 10 (including lamp 12 and lamp driver 14), a viewing screen system 30 with the viewing screen 34 on the lower left corner of the windshield 40 and a control unit 20.

The lamp driver 14 supplies electric current to lamp 12 when an "on" command is received from control unit 20. The current will be maintained until an "off" command is received.

The lamp 12 is of strobe type such as LED, laser diode, or discharge strobe light which can be turned on/off in short pulses. When it is on, it is multiple times brighter than ordinary head lamps. However, it will be operating at a low duty cycle such that the effective light output is the same as an ordinary headlamp. To be more precise, the combined effect of brightness of those light pulses and the low duty cycle should make the human eyes feeling the same as from an ordinary headlamp. In order that each pulse produces same brightness, the driving circuits in lamp driver 14 shall keep the capacitor always fully charged.

To operate at low duty cycle, we divide time into repeated base intervals and turn on the lamp for a fixed fraction of each base interval. For example we can set base interval at 50 ms and turn on the lamp during each 50 ms period for a total of 10 ms which makes the duty cycle 20% when the lamp has a brightness 4-5 times as ordinary lamps. The 10 ms on time is the sum of multiple pulses randomly selected in each base interval. The length of base interval shall not be too long to make the eye feel flickering or to blur the image—it should be shorter than movie frame time or even faster if the vehicle is running fast. We use 50 ms as example because it is just a little longer than movie frame time but 50 is a close round number easy to use for explanation purposes.

Alternatively, the lamps can use ordinary light source with a switching filter in its front but this will make the lamp system less efficient because of the low duty cycle.

The viewing screen 34 is a sheet of light switching panel attached to the lower left corner of the windshield 40 whether it is fixed on windshield or can be rolled up and stored inside the left frame of the windshield (as 34a) and be pulled out and attached to windshield 40 using a suction cup 44 or other means. The light switching mechanism can be a layer of liquid crystal or other light switching mechanism. When the command from control unit 20 is "on", the screen driver 32 sends adequate voltage to viewing screen 34 to turn it transparent. The voltage stays the same until another command is received. An "off" command makes the screen driver 32 output to change to another voltage which darkens the viewing screen 34. An override switch 36 will block the command from control unit 20 and latch the viewing screen 34 to transparent mode for day time and for the period when there is no headlight glare present such as when driving on a divided highway with light barrier between the two way traffic. The transparent mode should be the default mode of the screen.

The control unit 20 generates on/off signals to turn on the lamp 12 and the viewing screen 34 ("on" means transparent) simultaneously. It has a clock 22 to divide time into base intervals and sub-intervals. It also has a random number generator 24 to be used to select n numbers from a set of N numbers every time a new base interval starts. Those n numbers are used to select the corresponding sub-intervals in each base interval. For example, if we use 50 millisecond for base interval and divide it into 50 sub intervals of 1 ms each, we have N=50. We can take n=10 to turn on the light for 10 ms in every 50 ms. This way, the system has a duty cycle of 20%. If the oncoming headlight is from ordinary lamps because the viewing screen 34 is off 80% of time, the oncoming light will be dimmed by 80%.

For a headlight from the approaching vehicle with the same mechanism installed because of the randomness in the selection of sub-intervals, the probability of matching at least 5 "on" sub-intervals of the two systems is less than 2% (the same formula for winning lottery calculation in Excel format):

Probability of matching at least 5 sub-intervals=
(combin(10,5)*combin(40,5)+combin(10,6)
*combin(40,4)+combin(10,7)*combin(40,3)+
combin(10,8)*combin(40,2)+combin(10,9)
*combin(40,1)+combin(10,10)*combin(40,0))/
combin(50,10)=0.018

That is, the headlight of such approaching vehicle being dimmed less than 50% by the receiving viewing screen has a probability of less than 2% for a specific 50 ms base interval. It is much more improbable (probability<2%*2%) that the next base interval will also be dimmed less than 50%.

Now, what if the clocks of the two systems are not synchronized (it is usually the case) so the end points of sub-intervals do not match between the two systems? Because 4/5 of sub-intervals are "off" while only 1/5 sub-intervals are "on", any "on" sub-interval's neighbor has more (4:1) chances to be an "off" sub-interval. That is, any shift will more likely to reduce total overlapping "on" time between the two systems even further. Therefore, it is almost certain that headlight glare is significantly reduced.

On the other hand, the probability of zero match of sub-intervals of the two systems is also low (8.3%). Besides, the viewing screen 34 can be made less dark when "off" to allow adequate level of lights to pass. That makes the lights being dimmed but not completely blocked, because the driver still wants to see the lights but only at low intensity as not to interfere with the driver's ability of seeing other objects.

The numbers 50 ms and 10 ms are just examples to explain how the system works. The optimal selection of such numbers may differ based on vehicle design such as windshield shape and on government regulations and the maximum switching speed of lamp and viewing screen as well as human preference. In fact, the oscillator of clock 22 can be made variable within a limited range centered at a rate set by the manufacturer (or eventually by certain industry standard) such that the time scale can be changed to fit the needs of the driver or to adapt to vehicles speed (The faster the moving speed, the faster the image change which makes faster clock desirable). For example, the clock can run faster so that the base interval becomes 20 ms with randomly selected ten "on" pulses having duration of 0.4 ms each. This way, the duty cycle does not change and the effective brightness does not change but it makes the fast changing scene smoother.

For night time driving the main source of illumination is your own vehicle's headlights. The driver should be able to see all objects illuminated by his/her own headlights clearly. Because whenever the lamp is on, the viewing screen is also on (meaning transparent), the driver sees what he/she intends to see at full intensity while the glare from the headlight of oncoming vehicles is reduced.

Because the oncoming vehicles are always on the left side (in US and many other countries) and are on the road, the viewing screen 34 needs to cover the lower left corner of windshield only. This leaves most part of the windshield unblocked so traffic lights and other objects are not being affected. As for the lower left corner, because it is in the beam of your own headlight so the visibility of objects in this corner shall be improved now the glare from oncoming headlights is reduced.

In case this system is to be used for other purposes such as in combination with spot light in a police car, the viewing screen can be mounted at other locations as needed.

The invention claimed is:

1. A method for reducing glare with a system composed of a lamp system, a control unit and a viewing screen system by simultaneously turning on/off bright headlamp and viewing screen at low duty cycle with randomly selected pulses.

2. The method of claim 1, wherein a clock sets up repeated time intervals called base intervals.

3. The method of claim 1, wherein the clock divides each base interval into a fixed number of sub-intervals.

4. The method of claim 1, wherein a random number generator generates a fixed number of random numbers for each base interval for the selection of sub-intervals within that base interval to turn on headlamp and viewing screen.

5. The method of claim 4, wherein the total number of sub-intervals selected in each base interval is based on the duty cycle which makes the effective brightness within range of government regulations.

6. The method of claim 1, wherein the light source of said lamp is LED, laser diode or strobe discharge bulb.

7. The method of claim 1, wherein the viewing screen can be made less dark when "off" to allow desired light to pass through.

8. The method of claim 1, wherein the viewing screen is mounted on left lower corner of windshield to allow clear viewing of traffic signals and other objects through other part of windshield.

9. An alternate embodiment of claim 8, wherein the viewing screen can be mounted at other locations as needed when the system is used for other purposes such as spot light in police car.

10. The method of claim 1, wherein the default mode of the viewing screen is transparent.

11. In one embodiment of the method of claim 1, the viewing screen is directly attached to windshield glass.

12. In an alternate embodiment of the method of claim 1, the viewing screen can be rolled up and stored in windshield frame and can be pulled out for use with one end attached to windshield using a suction cup or other means.

13. The method of claim 2, wherein the rate of the clock in the control unit can be adjusted faster to reduce blur or slower to extend screen life.

* * * * *